(12) United States Patent
Oh et al.

(10) Patent No.: US 7,785,736 B2
(45) Date of Patent: Aug. 31, 2010

(54) JELLY-ROLL TYPE ELECTRODE ASSEMBLY AND SECONDARY BATTERY INCLUDING THE SAME

(75) Inventors: Won-Seog Oh, Seoul (KR); Soon-Ki Woo, Suwon-si (KR); Kwang-Soo Kim, Daegu-si (KR); Chang-Seob Kim, Cheonan-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 12/536,782

(22) Filed: Aug. 6, 2009

(65) Prior Publication Data

US 2009/0297931 A1 Dec. 3, 2009

Related U.S. Application Data

(63) Continuation of application No. 10/911,661, filed on Aug. 5, 2004, now Pat. No. 7,666,545.

(30) Foreign Application Priority Data

Aug. 19, 2003 (KR) .................. 10-2003-0057277

(51) Int. Cl.
*H01M 2/14* (2006.01)
*H01M 2/18* (2006.01)

(52) U.S. Cl. ..................... 429/129; 429/133
(58) Field of Classification Search ............ 429/133, 429/164
See application file for complete search history.

(56) References Cited

U.S. PATENT DOCUMENTS 4,709,472 A * 12/1987 Machida et al. ............ 29/623.1

| | | |
|---|---|---|
| 5,354,629 A | 10/1994 | Kuroda et al. |
| 5,508,122 A | 4/1996 | Narukawa et al. |
| 5,989,743 A | 11/1999 | Yamashita et al. |

(Continued)

FOREIGN PATENT DOCUMENTS

CN        1245590 A        2/2000

(Continued)

OTHER PUBLICATIONS

Certificate of Patent issued by the Chinese Patent Office in Chinese Patent Application No. ZL200410057859.9.

(Continued)

*Primary Examiner*—Dah-Wei D Yuan
*Assistant Examiner*—Adam A Arciero
(74) *Attorney, Agent, or Firm*—Stein McEwen, LLP

(57) ABSTRACT

An electrode assembly including a first electrode strip having a first electrode collector coated with at least a first electrode active material, an exposed portion of the first electrode collector attached with a first electrode tab; a second electrode strip having a second electrode collector coated with at least a second electrode active material and is rolled together with the first electrode strip, an exposed portion of the second electrode collector is attached with a second electrode tab; and at least one inter-electrode strip separator is positioned between the first and second electrode strips, wherein at least one sheet of protective separator, which is extended from the inter-electrode strip separator, is further positioned on a side of the first electrode strip attached with the first electrode tab.

29 Claims, 10 Drawing Sheets

U.S. PATENT DOCUMENTS

| | | | |
|---|---|---|---|
| 6,309,777 B1 | 10/2001 | Ohta et al. | |
| 7,060,387 B2 * | 6/2006 | Kim et al. | 429/94 |
| 2002/0142211 A1 | 10/2002 | Nakanishi et al. | |
| 2006/0035147 A1 | 2/2006 | Lam et al. | |

FOREIGN PATENT DOCUMENTS

| | | |
|---|---|---|
| CN | 1253384 A | 5/2000 |
| CN | 1387683 A | 12/2002 |
| JP | 4-109551 | 4/1992 |
| JP | 7-320770 | 12/1995 |
| JP | 11-273660 | 10/1999 |
| JP | 2000-277155 | 10/2000 |
| JP | 2001-273881 | 10/2001 |

OTHER PUBLICATIONS

U.S. Appl. No. 10/911,661, filed Aug. 5, 2004, Won-Seog OH et al., Samsung SDI Co., Ltd.

U.S. Appl. No. 12/536,811, filed Aug. 6, 2009, Won-Seog OH et al., Samsung SDI Co., Ltd.

U.S. Appl. No. 12/536,837, filed Aug. 6, 2009, Won-Seog OH et al., Samsung SDI Co., Ltd.

* cited by examiner

JELLY-ROLL TYPE ELECTRODE ASSEMBLY AND SECONDARY BATTERY INCLUDING THE SAME

CROSS-REFERENCE TO RELATED APPLICATION

This application is a continuation of application Ser. No. 10/911,661, filed on Aug. 5, 2004, now U.S. Pat. No. 7,666,545, which claims the benefit of Korean Application No. 10-2003-0057277, filed on Aug. 19, 2003, in the Korean Patent Office, the disclosures of which are incorporated herein, by reference.

BACKGROUND OF THE INVENTION

1. Field of the Invention

The present invention relates to a jelly-roll type electrode assembly and a secondary battery including the same, and particularly to, a jelly-roll type electrode assembly in which short-circuiting between electrodes can be prevented, and a secondary battery including the same 2. Description of the Related Art In general, secondary batteries, which are distinguished from primary batteries by their ability to be repeatedly charged and discharged, have been widely used in cellular phones, notebook computers, camcorders, and other portable electronic devices. Lithium secondary batteries having an operating voltage of 3.6V or greater, which is three times higher than nickel-cadmium (Ni—Cd) batteries, have become popular as a power source for various kinds of electronic equipment and nickel-hydrogen batteries and, are frequently used because of their high energy density per unit of weight.

Such lithium secondary batteries mostly use a lithium oxide as a positive active material and a carbonaceous material as a negative active material. Lithium secondary batteries can be classified into liquid electrolyte batteries, also known as lithium ion batteries, and polymer electrolyte batteries, also known as lithium polymer batteries, according to the type of electrolyte used. Lithium secondary batteries are manufactured in various shapes, typically, in cylindrical, rectangular, or pouch forms.

A second battery uses a jelly-roll type electrode assembly manufactured by applying an active material onto a substrate, drying the substrate, pressing it using a roller, and severing it into a positive electrode strip and a negative electrode strip, interposing a separator between the positive and negative electrode strips to make a multi-layer structure, and rolling the multi-layer structure in a jelly-roll form. A cylindrical battery is made by placing such an electrode assembly into a cylindrical can, injecting an electrolyte into the cylindrical can, and sealing the cylindrical can. A rectangular battery is made by applying a pressure to such an electrode assembly so that it has plane surfaces, and then, placing the electrode assembly into a rectangular can.

In such an electrode assembly, a positive electrode tab and a negative electrode tap are drawn out from the positive electrode strip and the negative electrode strip, respectively. In particular, one of the positive and negative electrode tabs is drawn out upward from its related electrode strip and electrically connected to a cap assembly for sealing the can. The other electrode strip is drawn out downward from its related electrode strip and electrically connected to a projection formed at the bottom of the can. In the case of the rectangular secondary battery, both the positive and negative electrode tabs may be drawn out upward from their electrode strips.

As described above, a conventional cylindrical battery includes an electrode assembly made by interposing only a separator between a major electrode strip and an auxiliary electrode strip to make a multi-layer structure and rolling the multi-layer structure. The separator is, however, prone to be broken at portions of the positive and negative electrode strips welded together with electrode tabs, thus causing electrical short-circuiting. An electrode tab enables movement of electric charges from a battery to the outside, and therefore, when electric charges are concentrated on the electrode tab, the electrode tab is heated. As a result, an electrode strip attached with the heated electrode tab is also heated, thus resulting in breaking of the separator. Then, although the electrode strip attached with the electrode tab is separated via the separator from the other electrode strip of different polarity, the breaking of the separator causes electrical short-circuiting between the heated electrode strip and the other electrode strip.

Also, when a defect, such as a burr, forms at an end of an electrode tab during manufacture of the electrode tab, the burr damages the separator, especially a thin separator, thus causing an electrical short-circuiting via a damaged portion of the separator.

Japanese Patent Publication No. 11-273660 has suggested a battery electrode assembly in which a portion of an electrode strip welded together with an electrode tab is coated with a polymer material, thereby preventing a separator from being damaged due to the formation of a burr or other defect of the electrode tab. However, in this case, since a conventional battery manufacturing process further requires a polymer coating process, the manufacture process is more complicated and manufacturing costs are increased.

Japanese Patent Publication No. 4-109551 discloses a jelly-roll type battery electrode assembly in which an electrode tab is bent inward more than the rolled battery electrode assembly and a bent portion of the electrode tab is located at a center portion of an inner diameter of the rolled electrode assembly. However, it is very difficult to position the electrode tab at the center of the rolled electrode assembly. Even if the electrode is positioned at the center, it is difficult to insert a welding rod into the electrode assembly due to the presence of the electrode tab during a subsequent process of welding an electrode tab together with a base plane of a can.

U.S. Pat. No. 5,508,122 discloses a secondary battery with a spiral electrode unit. In the spiral electrode unit, same-polarity regions of an electrode strip attached with a lead toward a center portion of the spiral electrode unit are positioned via a separator on both sides of exposed regions of electrode core material, and a lead attached to the other electrode strip is positioned at the outmost winding of the spiral electrode unit. Accordingly, even if the separator is damaged, electrical short-circuiting can be prevented.

However, in the spiral electrode unit, the exposed regions must be long enough to position the same-polarity regions of the electrode strip via a separator on both sides of the exposed regions, and a starting point of rolling the other electrode strip is later than that of rolling the electrode strip. Thus, the secondary battery includes many portions of electrode strips unnecessary for battery reaction, thereby increasing manufacturing costs. If the secondary battery is rectangular shaped, that is, when a length of the battery in circumference is long, this problem becomes more serious.

SUMMARY OF THE INVENTION

The invention provides a jelly-roll type electrode assembly designed to reduce electrical short-circuiting at a portion of an electrode strip welded together with an electrode tab, and a secondary battery including the same.

The invention also provides a jelly-roll type electrode assembly in which electrical short-circuiting can be prevented even if an electrode tab has a surface defect such as a burr, and a secondary battery including the same.

The invention also provides a jelly-roll type electrode assembly fabricated using conventional equipment but electrical short-circuiting between electrode strips can be prevented, and a secondary battery including the same.

According to an aspect of the invention, there is provided an electrode assembly comprising a first electrode strip including a first electrode collector coated with at least a first electrode active material, an exposed portion of the first electrode collector attached with a first electrode tab; a second electrode strip which includes a second electrode collector coated with at least a second electrode active material and is rolled together with the first electrode strip, an exposed portion of the second electrode collector attached with a second electrode tab; and at least one inter-electrode strip separator is sandwiched between the first and second electrode strips. Here, at least a sheet of protective separator, which is extended from the inter-electrode strip separator, is further positioned on a side of the first electrode strip attached with the first electrode tab.

The first electrode tab may be formed at a center of the rolled electrode assembly. At least one of the inter-electrode strip separator and the protective separator is positioned on an opposite side of the side of the first electrode strip attached with the first electrode tab.

The at least one protective separator may be an end of the inter-electrode strip separator. The at least one protective separator, which is the end of the inter-electrode strip separator, is bent more than one time, for example twice, and sandwiched between the first and second electrode strips.

The first electrode tab may be positioned at a side of the first electrode collector a center of the electrode assembly.

The at least one protective separator may be extended from the inter-electrode strip separator while being rolled in the opposite direction in which the electrode assembly is rolled.

The electrode assembly is a rolled structure in which a sheet of the inter-electrode strip separator, the first electrode strip, a sheet of the inter-electrode strip separator, and the second electrode strip are sequentially multi-layer, wherein the at least one protective separator is extended from at least one of the two sheets of inter-electrode strip separators.

Starting points of applying the first and second active materials may be the same.

The second electrode strip may be positioned via the protective separator on a side of the first electrode strip attached with the first electrode tab.

The at least one protective separator may be extended to contact the opposite side of a side of the inter-electrode strip separator, which resides between the side of the first electrode strip attached with the first electrode tab and the second electrode strip, toward the center of the electrode assembly, the at least one protective separator positioned on at least the side of the first electrode strip attached with the first electrode tab.

According to another aspect of the invention, there is provided an electrode assembly comprising a first electrode strip including a first electrode collector covered with at least a first electrode active material, an exposed portion of the first electrode collector attached with a first electrode tab; and a second electrode strip including a second electrode collector covered with at least a second electrode active material, an exposed portion of the second electrode collector attached with a second electrode tab. The respective first and second electrode strips are sandwiched between two sheets of separators and positioned on one of the two sheets of separators so as to make a multi-layer structure, the multi-layer structure is inserted into a mandrel and rolled using the mandrel, and at least one of the two sheets of separators is inserted into the mandrel and its portion is drawn out from the mandrel by at least half a length the mandrel in conference, and is rolled using the mandrel.

The drawn portion may be extended to the side of the first electrode strip attached with the first electrode tab.

The second electrode strip may be positioned via the drawn portion of the separator and the other separator on the side of the first electrode strip attached with the first electrode tab.

Only the separators may be present on the opposite side of the side of the first electrode strip attached with the first electrode tab.

The length of the drawn portion of the separator is preferably longer than a sum of half the length of the mandrel in circumference and a distance between the mandrel and the side of the first electrode strip attached with the first electrode tab.

The drawn portion of the separator may be rolled at least half a round of the mandrel, and then the first electrode strip is rolled.

The first electrode tab may be positioned at a side of the first electrode collector toward a center portion of the electrode assembly.

The drawn portion of the separator may be extended while being wound in the opposite direction in which the electrode assembly is rolled.

According to another aspect of the invention, there is provided an electrode assembly comprising a first electrode strip including a first electrode collector coated with at least a first electrode active material, an exposed portion of the first electrode collector attached with a first electrode tab; a second electrode strip which includes a second electrode collector coated with at least a second electrode active material and is rolled together with the first electrode strip, an exposed portion of the second electrode collector attached with a second electrode tab; and at least an inter-electrode strip separator positioned between the first and second electrode strips. At least a sheet of protective separator, which is formed to be united with the at least one inter-electrode strip separator, and the exposed portion of the first electrode collector are further positioned at a side of the first electrode strip attached with the first electrode tab.

The first electrode tab may be positioned at a center of the electrode assembly. At least one of the at least one inter-electrode strip separator and the at least one protective separator may be positioned at the opposite side of the side of the first electrode strip attached with the first electrode tab.

The at least one protective separator may be an end of the at least one inter-electrode strip separator. The at least one protective separator, which is the end of the at least one inter-electrode strip separator, may be bent twice and sandwiched between the first and second electrode strips.

The exposed portion of the first electrode collector may be extended to the side of the first electrode strip attached with the first electrode tab and bent twice and interposed between the first and second electrode strips.

The at least one protective separator may be extended from the inter-electrode strip separator while being wound in the opposite direction in which the electrode assembly is rolled.

The exposed portion of the first electrode collector may be extended to the side of the first electrode strip attached with the first electrode tab while the exposed portion being wound in the opposite direction in which the electrode assembly is rolled.

The electrode assembly may be a rolled structure in which a sheet of the inter-electrode strip separator, the first electrode strip, a sheet of separator, and the second electrode strip are sequentially positioned, wherein the protective separator is extended from at least one of the two sheets of separators.

Starting points of applying the first and second electrode active material may be the same.

The second electrode strip may be positioned via the protective separator and the exposed portion of the first electrode collector on the side of the first electrode strip attached with the first electrode tab.

According to another aspect of the invention, there is provided an electrode assembly comprising a first electrode strip including a first electrode collector coated with at least a first electrode active material, an exposed portion of the first electrode collector attached with a first electrode tab; and a second electrode strip including a second electrode collector coated with at least a second electrode active material, an exposed portion of the second electrode collector attached with a second electrode tab. The respective first and second electrode strips are sandwiched between two sheets of separators or positioned on one of the two sheets of separators so as to make a multi-layer structure, the multi-layer structure is inserted into a mandrel and rolled using the mandrel, and at least one of the two sheets of separators and the exposed portion of the first electrode collector are inserted into the mandrel and their portions are drawn out from the mandrel by a length equal to at least half a circumference of the mandrel, and are rolled.

The drawn portions may be extended to a side of the first electrode strip attached with the first electrode tab.

The second electrode strip may be positioned on the side of the first electrode strip attached with the first electrode tab, via the drawn portion of the separator and at least a separator between the first and second electrode strips.

The drawn portion of the extended portion of the first electrode collector may be extended to the side of the first electrode strip attached with the first electrode tab, wherein the second electrode strip is positioned via the drawn portion of the separator on a side of the drawn portion of the extended portion of the first electrode collector.

A length of the drawn portion of the exposed portion of the first electrode collector may be longer than a sum of half a length of the mandrel in circumference and a distance between the mandrel and the side of the first electrode strip attached with the first electrode tab, and a length of the drawn portion of the separator may be longer than that of the drawn portion of the exposed portion of the first electrode collector.

The drawn portion of the exposed portion of the first electrode collector may be wound half a round of the mandrel, and, then, the first electrode strip is rolled.

The first electrode tab may be positioned on a side of the first electrode collector toward a center portion of the electrode assembly.

The drawn portions of the separator and the exposed portion of the first electrode collector may be drawn out from the mandrel while the drawn portions are wound in the opposite direction in which the electrode assembly is rolled.

The separators may include a material selected from a group including polyethylene, polypropylene, and a copolymer of polyethylene and polypropylene, have a multi-layered structure, or include a polyolefin-based polymer with a molecular weight of 350 thousand or greater.

An active material may not be applied onto a portion of the first or second electrode strip which resides on the other adjacent second or first electrode strip of different polarity via an active material of the other electrode strip and the separators.

The first active material may include a lithium-based oxide and the second electrode active material comprises a carbon-based material. The first electrode collector may be formed of aluminum or an aluminum alloy and the second electrode collector may be formed of copper or a copper alloy.

According to another aspect of the invention, there is provided a secondary battery including an electrode assembly placed in a cylindrical or rectangular can or a pouch case.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
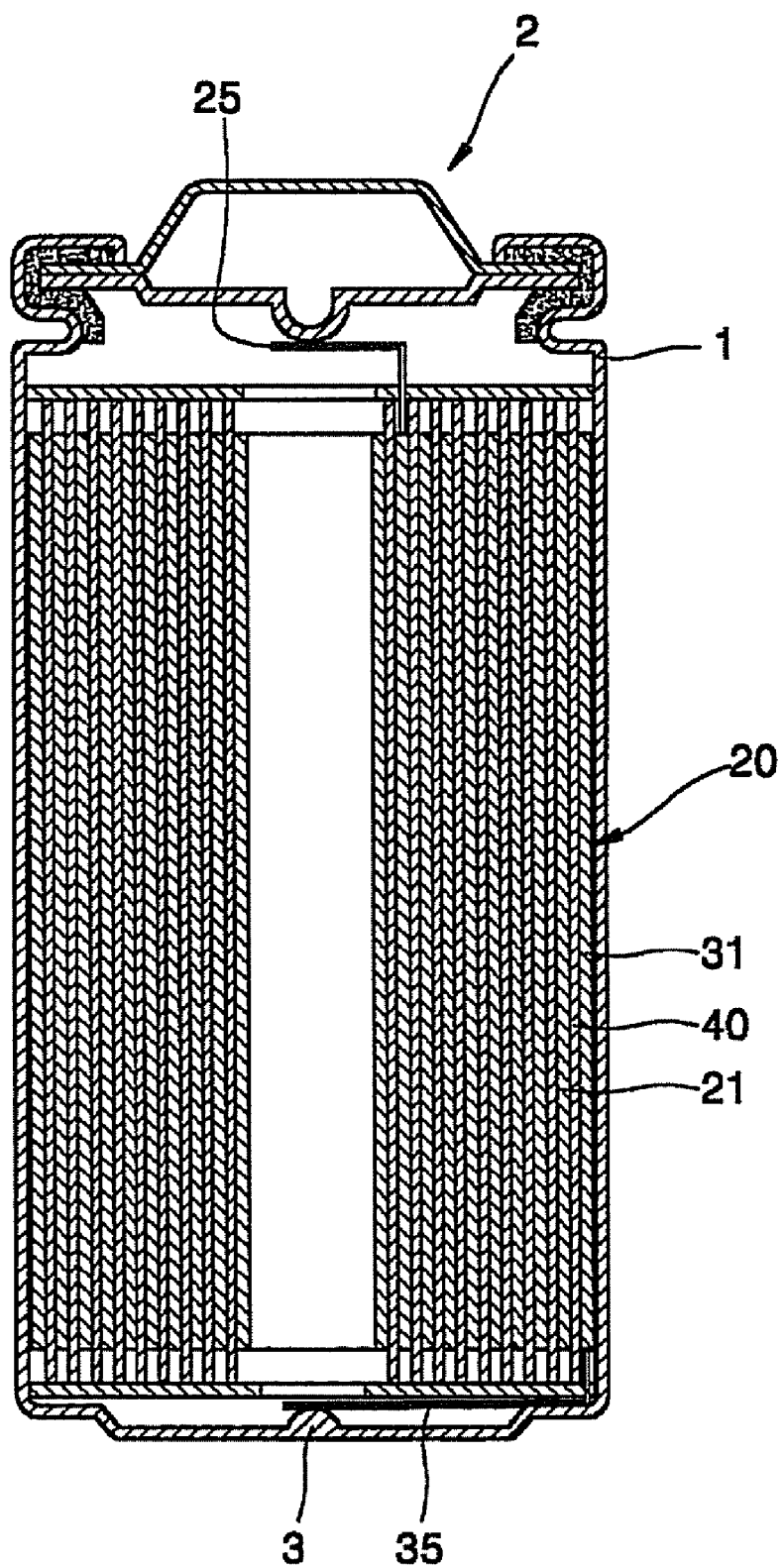
FIG. 1 is a cross-sectional view of a cylindrical secondary battery including an electrode assembly according to an embodiment of the invention.

Reference will now be made in detail to the embodiments of the present invention, examples of which are illustrated in the accompanying drawings, wherein like reference numerals refer to the like elements throughout. The embodiments are described below to explain the present invention by referring to the figures.

The invention is described with respect to a cylindrical secondary battery with a jelly-roll type electrode assembly; however, the invention is not limited to this disclosure. For example, if a battery can include a jelly-roll type electrode assembly according to the present invention, a shape of the battery is not limited to any particular shape. Further, the present invention is also applicable to a primary battery.

FIG. 1 is a cross-sectional view of a cylindrical secondary battery with a jelly-roll type electrode assembly 20 according to an aspect of the invention. Referring to FIG. 1, the electrode assembly 20 is placed in a cylindrical can 1, and the electrode assembly 20 is a rolled multi-layer structure in which a first electrode strip 21 and a second electrode strip 31 are positioned and a separator 40 is interposed between the first and second electrode strips 21 and 31 so as to insulate them from each other. The cylindrical can 1 is formed of a metal material so that it acts as a connector to the first or second electrode strip 21 or 31. The can 1 is preferably formed of aluminum or an aluminum alloy and electrically connected to the second electrode strip 31 to form a second electrode connector.

In the electrode assembly 20, a first electrode tab 25 and a second electrode tab 35 are drawn out from the first and second electrode strips 21 and 31, respectively. More specifically, the first electrode tab 25 is drawn out from a center portion of the electrode assembly 20 and the second electrode tab 35 is drawn out from an edge of the electrode assembly 20. The first electrode tab 25 is drawn out upward to be electrically connected to a cab assembly 2 for sealing the can 1. The second electrode tab 35 is drawn out downward to be electrically connected to a bottom 3 of the can 1. The cab assembly 2 connected to the first electrode tab 25 acts as a first electrode connector and the can 1 connected to the second electrode tab 35 acts as the second electrode connector.

Figure 2:
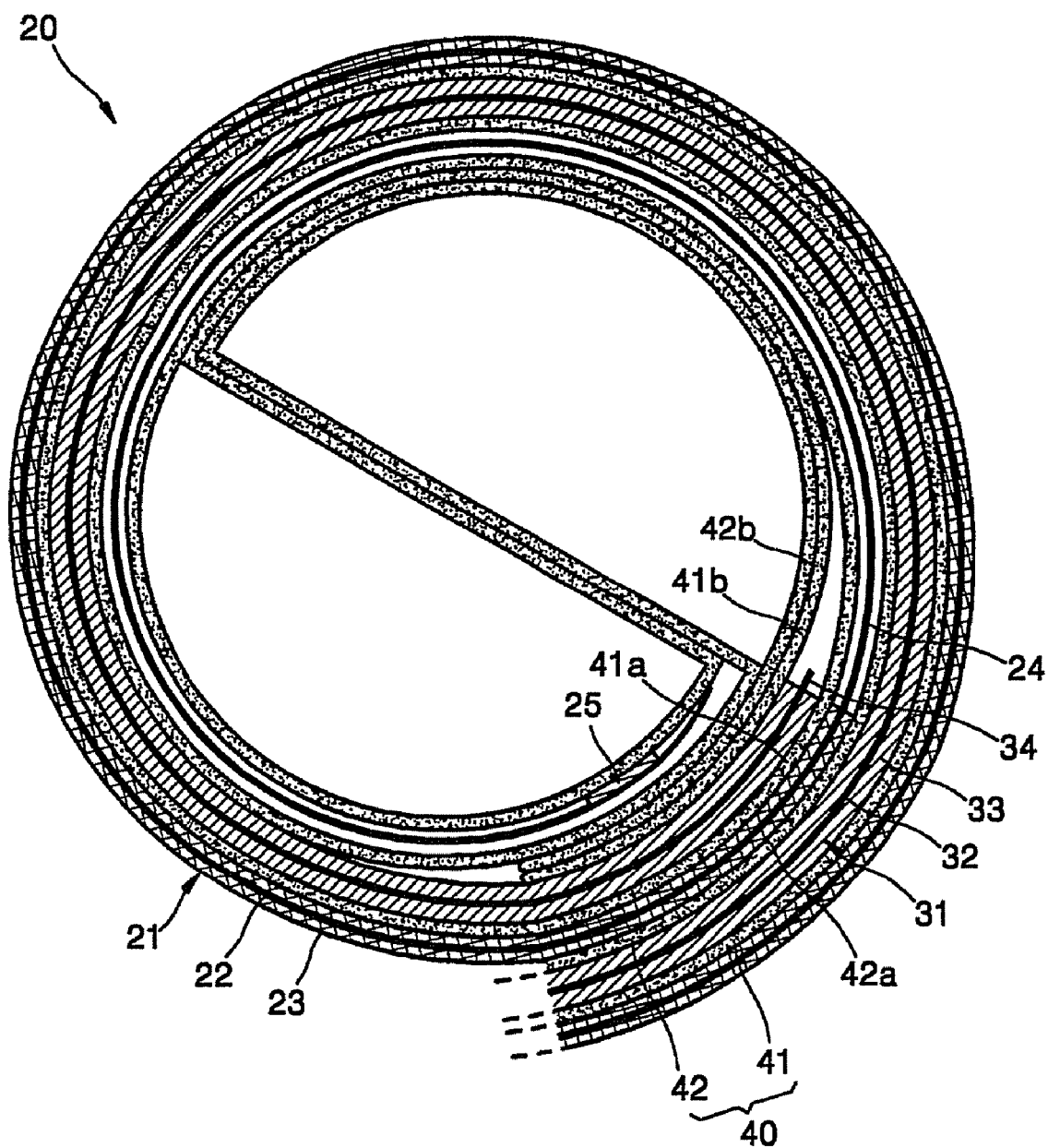
FIG. 2 is a cross-sectional view of a center portion of an electrode assembly according to an embodiment of the invention.

Referring to FIG. 2, an electrode assembly 20 according to an aspect of the invention includes a first electrode strip 21 and a second electrode strip 31. In this embodiment, the first electrode strip 21 and the second electrode strip 31 act as a positive electrode strip and a negative electrode strip, respectively. However, the invention is not limited to the above description. That is, the first electrode strip 21 and the second electrode strip 31 may act as a negative electrode strip and a positive electrode strip, respectively.

Figure 3:
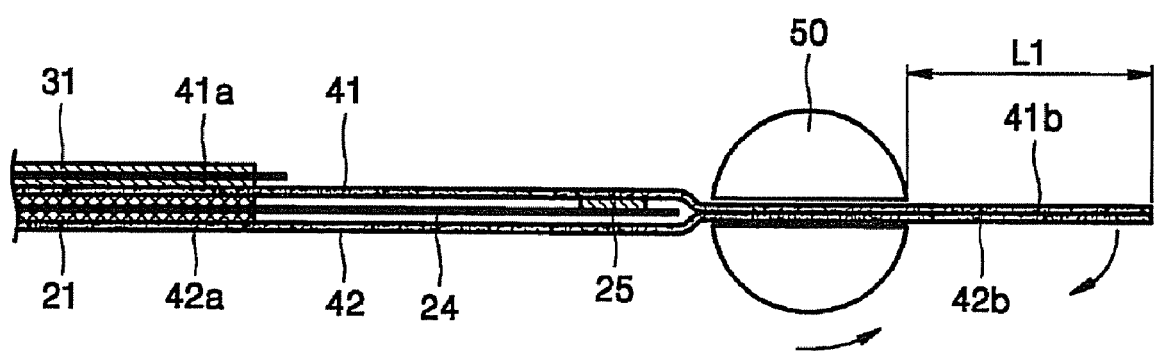
FIG. 3 illustrates a method of rolling the electrode assembly of FIG. 2 according to an embodiment of the invention.

As shown in FIG. 2, the first electrode strip 21 includes a first electrode collector 22 and an electrode mixture 23 containing an electrode active material, and the second electrode strip 31 includes a second electrode collector 32 and an electrode mixture 33 containing an electrode active material. FIG. 2 illustrates a center portion of the rolled electrode assembly 20 according to an aspect of the invention. FIG. 3 illustrates a method of rolling the electrode assembly 20 of FIG. 2, according to an aspect of the invention.

Hereinafter, the electrode assembly 20 will be described with reference to FIGS. 2 and 3 in a greater detail.

When the electrode assembly 20 is used in conjunction with a lithium secondary battery, the first electrode strip 21 may be used as a positive electrode strip. In this case, the first electrode collector 22 is formed using a film type thin metal plate, preferably, a thin aluminum film. The first electrode mixture 23, which is formed at least one surface of the first electrode collector 22, may be a mixture of a first electrode active material (a lithium-based oxide), a binder, a plasticizer, and/or a conductive material. The first electrode collector 22 has at least one surface covered with the first electrode mixture 23 and an exposed portion 24, which is not coated with the first electrode mixture 23. The exposed portion is preferably a front end.

The second electrode strip 31, i.e., a negative electrode strip, may include the second electrode collector 32 made of a thin metal film, preferably copper. The second electrode mixture 33, which is formed at least one surface of the second electrode collector 32, may be made of a mixture of a carbon-based second electrode active material, a binder, a plasticizer, and/or a conductive material. The second electrode collector 32 includes at least one surface covered with the second electrode mixture 33 and includes an exposed portion (not shown), which is not covered with the second electrode mixture 33, at the electrode assembly 20. As shown in FIG. 1, the exposed portion 34 may be welded together with a second electrode tab 35. Also, as shown in FIG. 2, the second electrode collector 32 includes an exposed portion 34, which is not covered with the second electrode mixture 33, at its front end, the exposed portion 34 extending beyond a center portion of the electrode assembly 20, thus allowing the electrode assembly 20 to be more easily inserted into and rolled by a mandrel.

A first electrode tab 25 attached to the exposed portion 24 may be formed of aluminum material and a second electrode tab 35 attached to the outermost winding of the electrode assembly 20 may be formed of a nickel material.

The electrode assembly 20 is a rolled multi-layer structure in which the first electrode strip 21, at least a separator 40, and the second electrode strip 31 are sequentially positioned. The separator 40 insulates the first electrode strip 21 and the second electrode strip 31 from each other and allows for an exchange of active material ions between the first and second electrode strips 21 and 31, thus causing a battery reaction. The separator 40 is preferably long enough to completely insulate the first and second electrode strips 21 and 31 from each other during a contraction or expansion phase.

If the separator 40 is applicable to a lithium secondary battery, the type of the separator 40 is not limited. For example, the separator 40 may be formed of a material selected from a group including polyethylene, polypropylene, and a copolymer of polyethylene and polypropylene. Otherwise, the separator 40 may be formed of a polyolefin-based polymer with a molecular weight of at least 350 thousand or be a multi-layered polymer.

The separator 40 may be made by biaxially orienting a gel-type sheet and removing a solvent from the sheet. Here, the gel-type sheet is formed using a composition (solution) with 18 percentage by weight of UHMWPE with an average modular weight from 200 thousand to 250 thousand and a composition (solution) with 82 percentage by weight of HDPE with an average modular weight from 40 thousand to 50 thousand. Alternatively, the separator 40 may be a three-layered structure of polypropylene, polyethylene, and polypropylene, wherein a diameter of a micro hole of each element ranges from 0.01 µm to 0.05 µm. Otherwise, the separator 40 may be made by fusing two sheets of polyethylene, or be made of a sheet of polyethylene. The fusing may be performed using heat.

The electrode assembly 20 is placed into the can 1, wherein the can 1 is filled with an electrolyte solution. The electrolyte solution may be a mixture (solution) of lithium salt and a carbonate-based organic solvent. Further, a halogenized aromatic compound such as fluorinated benzene may be added to the electrolyte solution.

According to the invention, the separator 40 includes two sheets of the first and second separators 41 and 42. The first electrode strip 21 and the second electrode strip 31 are formed between the first and second separators 41 and 42 and on sides of the first or second separator 41 or 42, respectively. As shown in FIGS. 2 and 3, the first separator 41 is sandwiched between the first and second electrode strips 21 and 31 and the second separator 42 is formed at a side of the first electrode strip 21. Accordingly, since the electrode assembly 20 is rolled using the two sheets of first and second separators 41 and 42, the first and second electrode strips 21 and 31 are insulated from each other. However, because the first and second electrode strips 21 and 31 are insulated from each other, arrangement of the first and second separators 41 and 42 is not limited to the above description. For instance, it is possible to manufacture the electrode assembly 20 to include a sheet of separator between the first and second electrode strips 21 and 31 or on a side of one of the first and second electrode strips 21 and 31.

The first separator 41 includes a first inter-electrode strip separator 41a and a first protective separator 41b which is extended from the first inter-electrode strip separator 41a. The second separator 42 includes a second inter-electrode strip separator 42a and a second protective separator 42b, which is extended from the second inter-electrode strip separator 42a. The first and second inter-electrode strip separators 41a and 42a are used as separation films of the secondary battery, allowing for an exchange of active material ions between the first and second electrode strips 21 and 31 coated with the first and second electrode mixtures 23 and 33, respectively. As shown in FIG. 2, the first and second protective separators 41b and 42b are extended from the first and second inter-electrode strip separators 41a and 42a, respectively. At least one of the first and second protective separators 41b and 42b is further positioned on a side of the first electrode strip 21 attached with the first electrode tab 25, thereby preventing electrical short-circuiting between the first and second electrode strips 21 and 31.

It is preferable that the first and second protective separators 41b and 42b are ends of the first and second inter-electrode strip separators 41a and 42a and further positioned on the opposite side of the side of the first electrode strip 21 attached with the first electrode tab 25. Referring to FIG. 2, the second electrode strip 31 may be positioned on the opposite side of the side of the first electrode strip 21 attached with the first electrode tab 25. In this way, it is possible to prevent electrical short-circuiting between the first and second electrode strips 21 and 31 resulting from damage to the separator caused by heating of the first electrode tab 25 attached to the first electrode strip 21 due to a concentration of electric charges.

In other words, as shown in FIG. 2, the first and second protective separators 41b and 42b, which are the ends of the first and second inter-electrode strip separators 41a and 42a, are further interposed between the side of the first electrode strip 21 attached with the first electrode tab 25 and the second electrode strip 31, thus increasing insulation between the first and second electrode strips 21 and 31. Thus, even if the inter-electrode strip separators 41a and 42a are damaged due to heat, the electrical short-circuiting may be avoided between the first and second electrode strips 21 and 31 because of the first and second protective separators 41b and 42b.

In addition, it is possible to prevent electrical short-circuiting between the first and second electrode strips 21 and 31 caused by a breaking of the separator due to a surface defect, such as a burr, of the first electrode tab 25. As shown in FIG. 2, only the separators are located on the opposite side of the side of the first electrode strip 21 attached with the first electrode tab 25 so as to completely prevent electrical short-circuiting at the side of the first electrode strip 21 with the first electrode tab 25.

In this embodiment, as shown in FIG. 2, both or one of the first and second protective separators 41b and 42b may be positioned on the side of the first electrode strip 21 with the first electrode tab 25.

As shown in FIG. 2, the first and second protective separators 41b and 42b are bent twice while being extended from the first and second inter-electrode separators 41a and 42a, respectively, extended while being wound in the opposite direction of rolling the electrode assembly 20, and then are positioned on the opposite side of a side of the first inter-electrode strip separator 41a, toward the center portion of the electrode assembly, between the first and second electrode strips 21 and 31. Although not shown in the drawings, when only the second protective separator 42b is extended and positioned on the opposite side of the first inter-electrode strip separator 41a between the first and second electrode strips 21 and 31, the second protective separator 42b may be extended to the first electrode tab 25 while being inserted between the first inter-electrode strip separator 41a and the first electrode strip 21.

Also, although not shown in the drawings, both the first and second inter-electrode strip separators 41a and 42a may be positioned on the opposite side of the side of the first electrode collector 22 attached with the first electrode tab 25. Also, a portion of the first electrode collector 22 may be exposed while at least two separators, e.g., the first and second inter-electrode strip separators 41a and 42a, are positioned on the opposite side of the side of the first electrode strip 21 attached with the first electrode tab 25.

General equipment used for rolling the electrode assembly 20 may be used for the insertion of the first and second protective separators 41b and 42b. For instance, when rolling the electrode assembly 20, using a device such as the mandrel 50 shown in FIG. 3, the electrode assembly 20 is fabricated by inserting two sheets of the first and second separators 41 and 42 into the mandrel 50, sandwiching the first electrode strip 21 between the first and second separators 41 and 42, placing the second electrode strip 31 on the other side of the first separator 41, and rotating the mandrel 50 in a direction as shown by the arrow in FIG. 3.

More specifically, the first and second separators 41 and 42 are inserted into the mandrel 50, a portion of each of these separators 41 and 42 is extended out from an end of the mandrel 50 by a length L1, and the mandrel 50 is rotated. Then, the portions of the lengths L1 of the first and second separators 41 and 42, which pass through the mandrel 50, are rotated in the opposite direction in which the mandrel 50 is rolled, as shown in FIG. 3. The rotated portions of the first and second separators 41 and 42 are extended to the portion of the first electrode strip 21 attached with the first electrode tab 25, so that an upper portion of the first separator 41 is covered with these portions. Next, the mandrel 50 is kept rolled to obtain the first and second protective separators 41b and 42b of FIG. 3.

The lengths L1 of the portions of the first and second separators 41 and 42, which are drawn out from the mandrel 50, must be at least half a length of the mandrel 50 in circumference. In this case, as shown in FIG. 3, the first electrode tab 25 is welded at a front end of the exposed portion 24 and the electrode assembly 20 is rolled while a front end of the first electrode tab 21 is placed adjacent to a mouth of the mandrel 50. More specifically, the lengths L1 of the portions of the first and second separators 41 and 42 must be longer than a sum of half the length of the mandrel 50 in circumference and a distance between the mandrel 50 and the side of the first separator 41 attached with the first electrode tab 25, so that the upper portion of the first separator 41 attached with the first electrode tab 25 is entirely covered with and protected by the portions of the first and second separators 41 and 42.

If the lengths L1 of the portions of the first and second separators 41 and 42 are extremely long, it unnecessarily increases the thickness of the electrode assembly 20. As shown in FIG. 3, the lengths L1 are preferably determined such that the first and second protective separators 41b and 42b, of the first and second separators 41 and 42, which are drawn out from the mandrel 50, are one-half a circumference of the mandrel 50 and are extended to a beginning of the second electrode strip 31. In other words, the lengths L1 are preferably equal to or less than a sum of half the circumference of the mandrel 50 and the distance between the mandrel 50 and an end of the second electrode strip 31 nearest to the mandrel 50.

After rolling the electrode assembly 20, the mandrel 50 is removed to obtain the electrode assembly 20 shown in FIG. 2. Otherwise, the mandrel 50 may be kept to be inserted into the electrode assembly 20.

Meanwhile, as shown in FIG. 2, it is possible to further prevent electrical short-circuiting between the first and second electrode strips 21 and 31 by welding the first electrode tab 25 to a side of the first electrode collector 22 toward the center of the electrode assembly 20.

In detail, when the first electrode tab 25 is welded to the side of the first electrode collector 22 toward the center of the electrode assembly 20, the first electrode tab 25 confronts the center of the electrode assembly 20 and only the first or second separator 41 or 42 contacts the first electrode tab 25. Therefore, even if the first electrode tab 25 includes a surface defect such as a burr, electrical short-circuiting is not caused.

Further, even if the burr of the first electrode tab 25 projects outside the electrode assembly 20, electrical short-circuiting does not occur unless all the first electrode collector 22 and the first and second protective separators 41b and 42b are damaged.

In addition, installation of the first and second protective separators 41b and 42b at the opposite side of the side of the first electrode strip 21 attached with the first electrode tab 25 prevents electrical short-circuiting between the first and second electrode strips 21 and 31 caused by heating of the first electrode tab 25.

As described above with reference to FIG. 2, the invention is described with respect to a case where the first electrode tab 25 is welded to the side of the first electrode collector 22 facing the center portion of the electrode assembly 20. Alternatively, as shown in FIG. 4, electrical short-circuiting may be prevented by welding the first electrode tab 25 to a side of the first electrode collector 22 facing an outer side of the electrode assembly 20.

Figure 4:
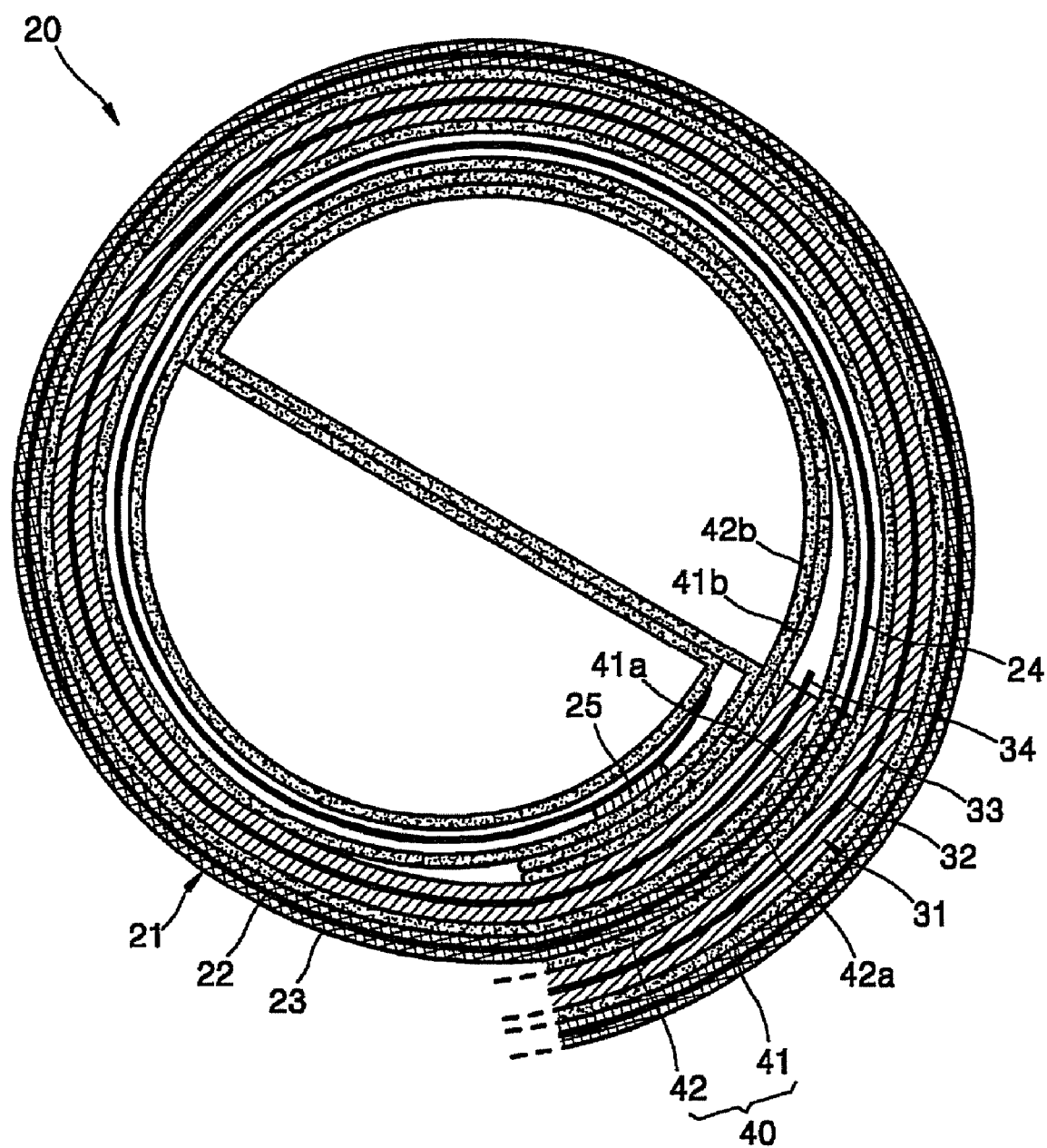
FIG. 4 is a cross-sectional view of the center portion of the electrode assembly of FIG. 1.

When protecting the side of the first electrode strip 21 attached with the first electrode tab 25 using the first and second protective separators 41b and 42b, starting points of the electrode mixtures 23 and 33 of the electrode strips 21 and 31 are constructed as shown in FIGS. 2 through 4. In this case, a battery reaction area is increased by rolling the electrode assembly 20, even to a small degree, thereby maximizing battery capacity. Although not shown in the drawings, an area available for battery reaction may be increased by forming a starting point of the first electrode strip 21 where the first electrode mixture 23 starts to be adjacent to the first electrode tab 25.

Figure 5:
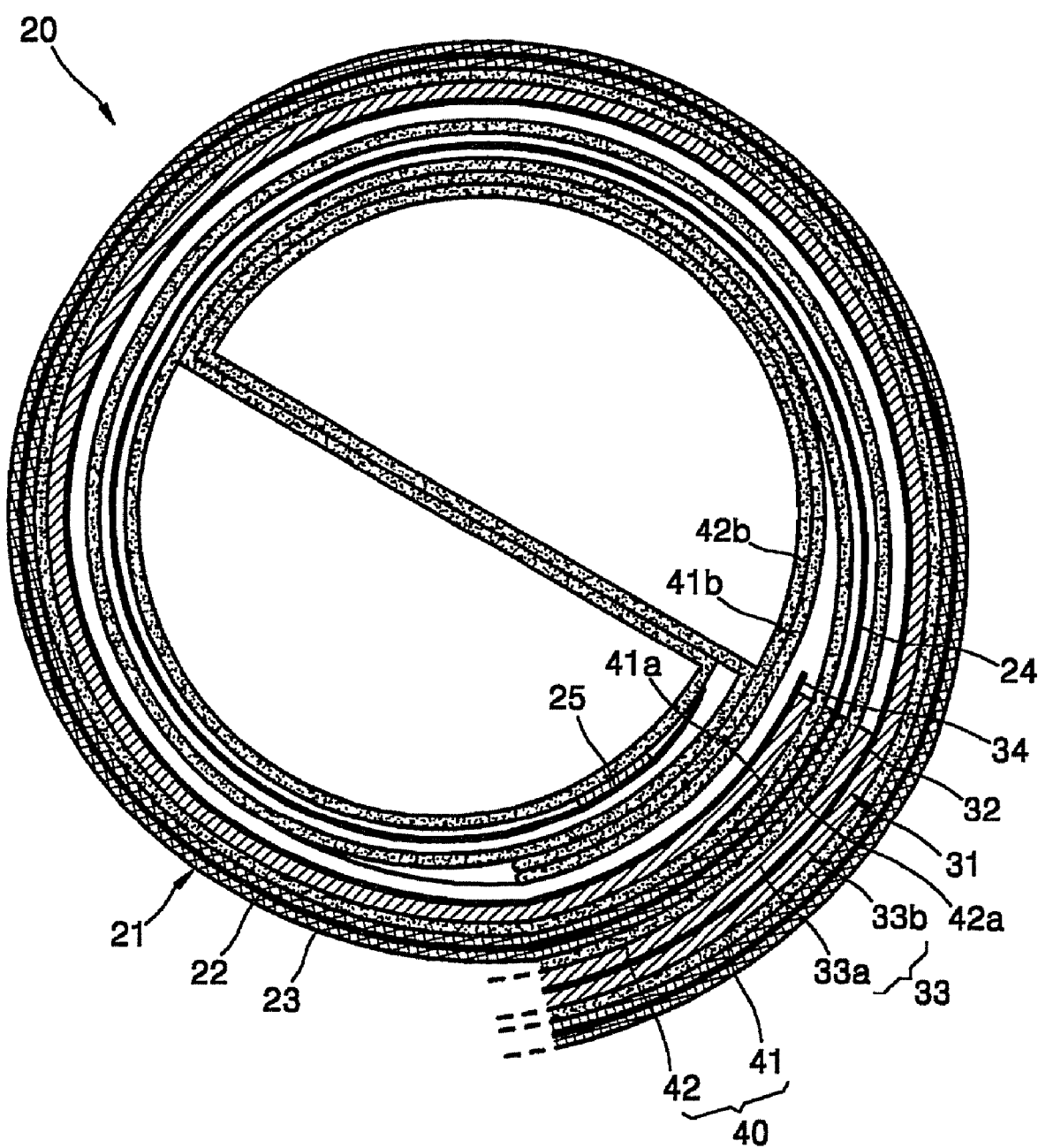
FIG. 5 is a cross-sectional view of the center portion of the electrode assembly of FIG. 2.

An active material may not be applied on a side of the first or second electrode strip 21 or 31 that does not contact an active material of the first or second electrode strip 21 or 31 of the opposite polarity via the first or second separator 41 or 42. More specifically, as shown in FIG. 5, an active material layer 33a and another active material layer 33b are positioned on a side of a second electrode collector 32 facing a center portion of the electrode assembly 20 and the opposite side thereof, respectively. Starting points of the active material layers 33a and 33b, at a front end of the second electrode strip 31, that is provided on the first electrode strip 21 via the separators 41 and 42 toward the center of the rolled electrode assembly 20, are different from each other. A side of the front end of the second electrode strip 31, which is unavailable for battery reaction, is not covered with an electrode mixture. Accordingly, increasing the volume of the electrode assembly 20 is not necessary. Such asymmetrical application of an active material is applicable to not only the first and second electrode strips 21 and 31 but also an outermost surface of a battery.

According to the invention, starting points of the first and second electrode strips 21 and 31, which are covered with an electrode mixture or not covered with the electrode mixture, may be set in various positions or locations.

Figure 6:
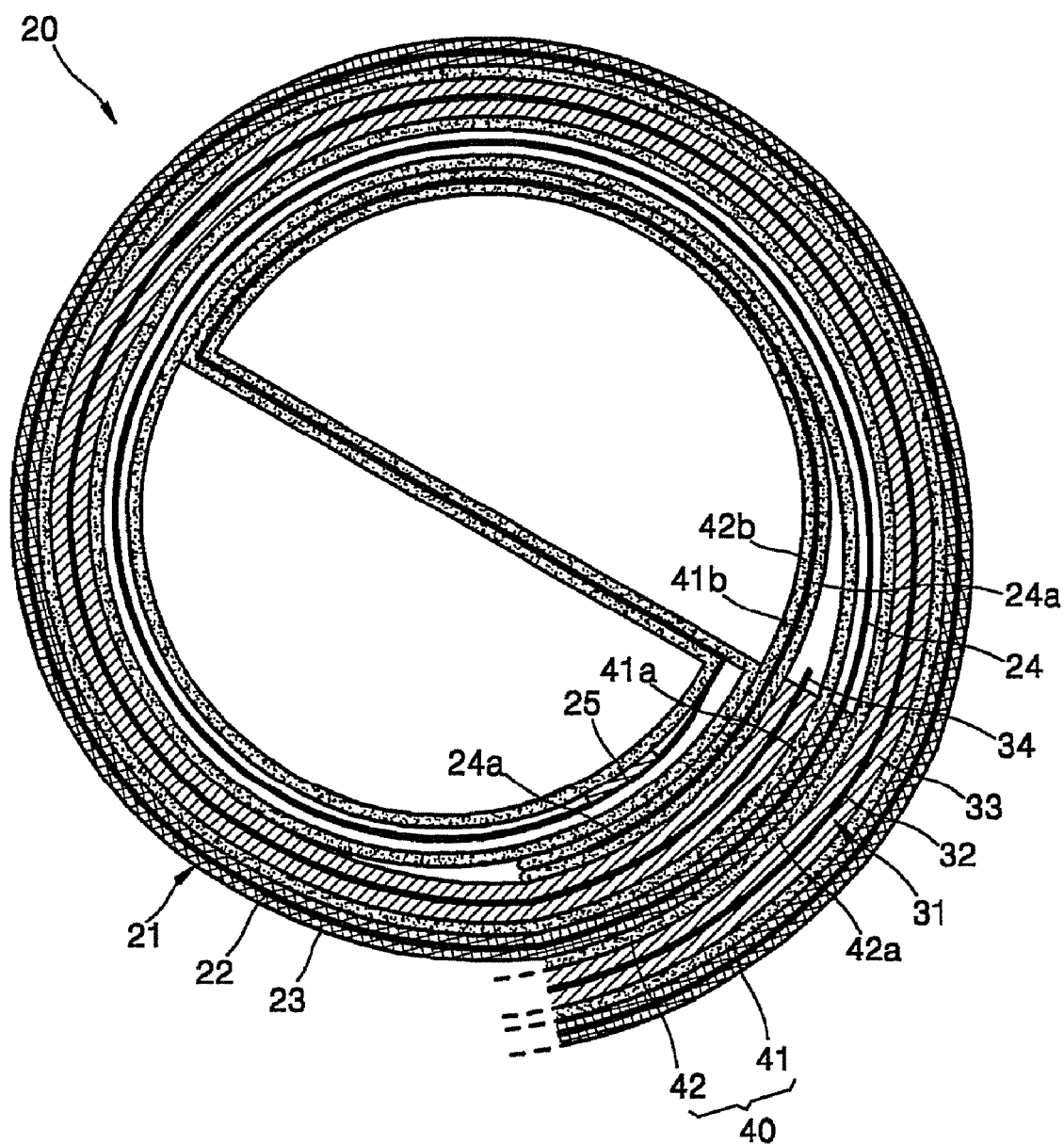
FIG. 6 is a cross-sectional view of a center portion of an electrode assembly according to another embodiment of the invention.

FIG. 6 is a cross-sectional view of a center portion of an electrode assembly 20 according to an aspect of the invention. Referring to FIG. 6, in addition to the first and second protective separators 41b and 42b, an exposed portion 24 of the first electrode strip 21 of a first electrode collector 22 may be positioned on the side of a first electrode strip 21 attached with a first electrode tab 25 in order to prevent electrical short-circuiting at the side of the first electrode strip 21 attached with the first electrode tab 25.

More specifically, a portion 24a extended from the exposed portion 24 is positioned between the first and second protective separators 41b and 42b on the other side of a side of a first inter-electrode strip separator 41a facing the opposite side of the side of the first electrode strip 21 attached with the first electrode tab 25. Accordingly, even if first and second separators 41 and 42 located on the side of the electrode strip 21 attached with the first electrode tab 25 are removed or torn-out, the portion 24a of the same polarity is positioned on the other side of the first electrode strip 21, thus preventing of electrical short-circuiting between the first and second electrode strips 21 and 31.

Figure 7:
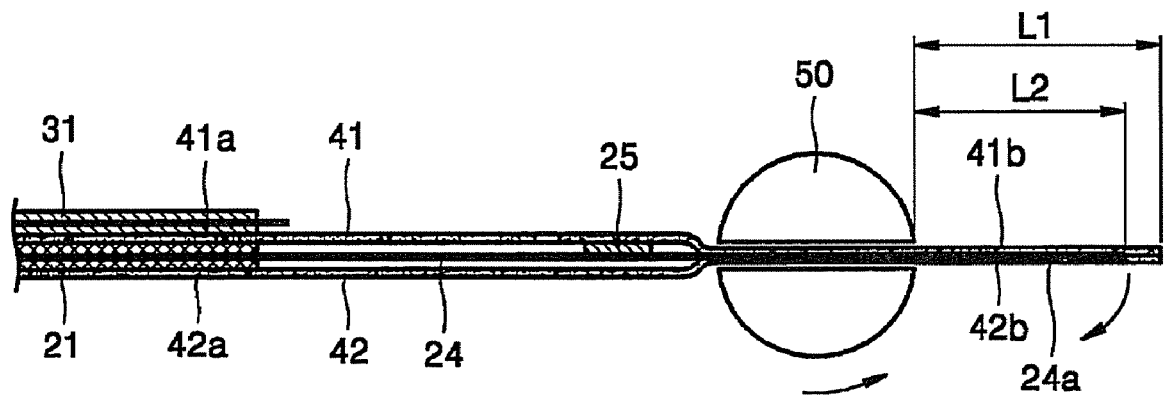
FIG. 7 illustrates a method of rolling of the electrode assembly of FIG. 6 according to an embodiment of the invention.

FIG. 7 illustrates a method of rolling of the electrode assembly of FIG. 6 according to an aspect of the invention. As described above with reference to FIG. 3, the first and second protective separators 41b and 42b are inserted into a mandrel 50 and their respective portions are drawn out from the mandrel 50 by a length L1. Next, a portion 24a of the exposed portion 24 of the first electrode strip 21 between the first and second separators 41 and 42, is inserted into the mandrel 50 and the portion 24a is drawn out from the mandrel 50 by a length L2. The drawn portions of the first and second protective separators 41b and 42b and the drawn portion of the portion 24a are then rolled by rotating the mandrel 50 in a predetermined direction. For example, the mandrel 50 may be rolled in a direction as shown by the arrow as shown in FIG. 7. The length L2 of the portion 24a passing through the mandrel 50 must be at least half the circumference of the mandrel 50. More particularly, the length L2 must be longer than a sum of half the length of the mandrel 50 in circumference and a distance between the mandrel 50 and the first electrode tab 25. Also, the length L2 of the portion 24a must be shorter than the lengths L1 of the first and second protective separators 41b and 42b passing through the mandrel 50. If the length L2 is longer than the length L1, the portion 24a may contact the second electrode strip 31 when the portion 24a is rolled back by the mandrel 50.

Similar to the rolled portions of the first and second protective separators 41b and 42b, the rolled portion of the portion 24a is bent twice by the mandrel 50 and positioned on the opposite side of the side of the first electrode strip 21 attached with the first electrode tab 25. That is, the portion 24a is extended to the side of the first electrode strip 21 attached with the first electrode tab 25 while being wound in the opposite direction in which the electrode assembly 20 is rolled.

Figure 8:
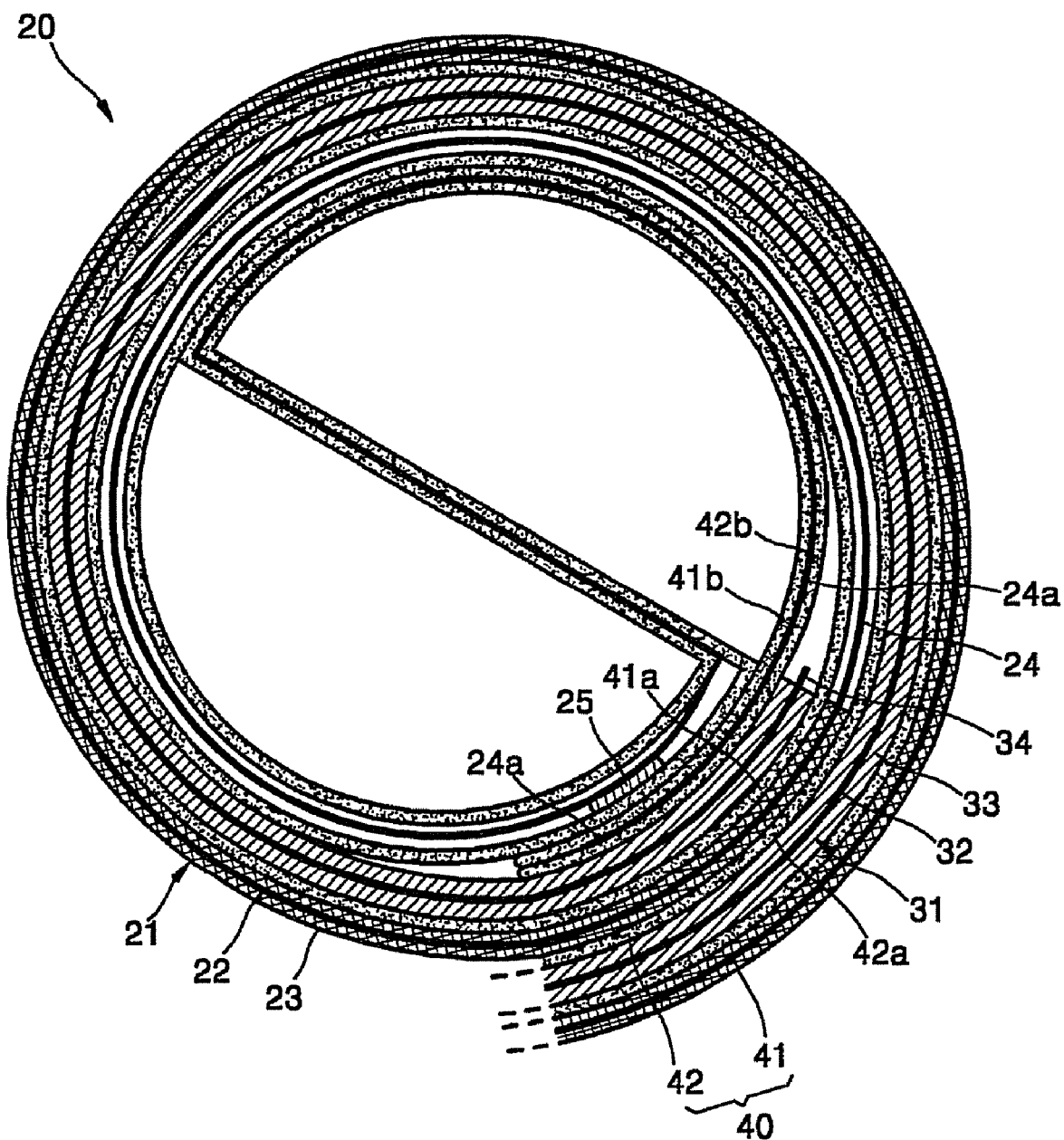
FIG. 8 is a cross-sectional view of the center portion of the electrode assembly of FIG. 6.

The method of FIG. 7 includes a situation where the first electrode tab 25 is welded to a side of the first electrode collector 22 toward a center portion of the first electrode assembly 20. However, the method of FIG. 7 is also applicable to a situation where the first electrode tab 25 may be welded to the other side of the first electrode collector 22, as shown in FIG. 8.

Figure 9:
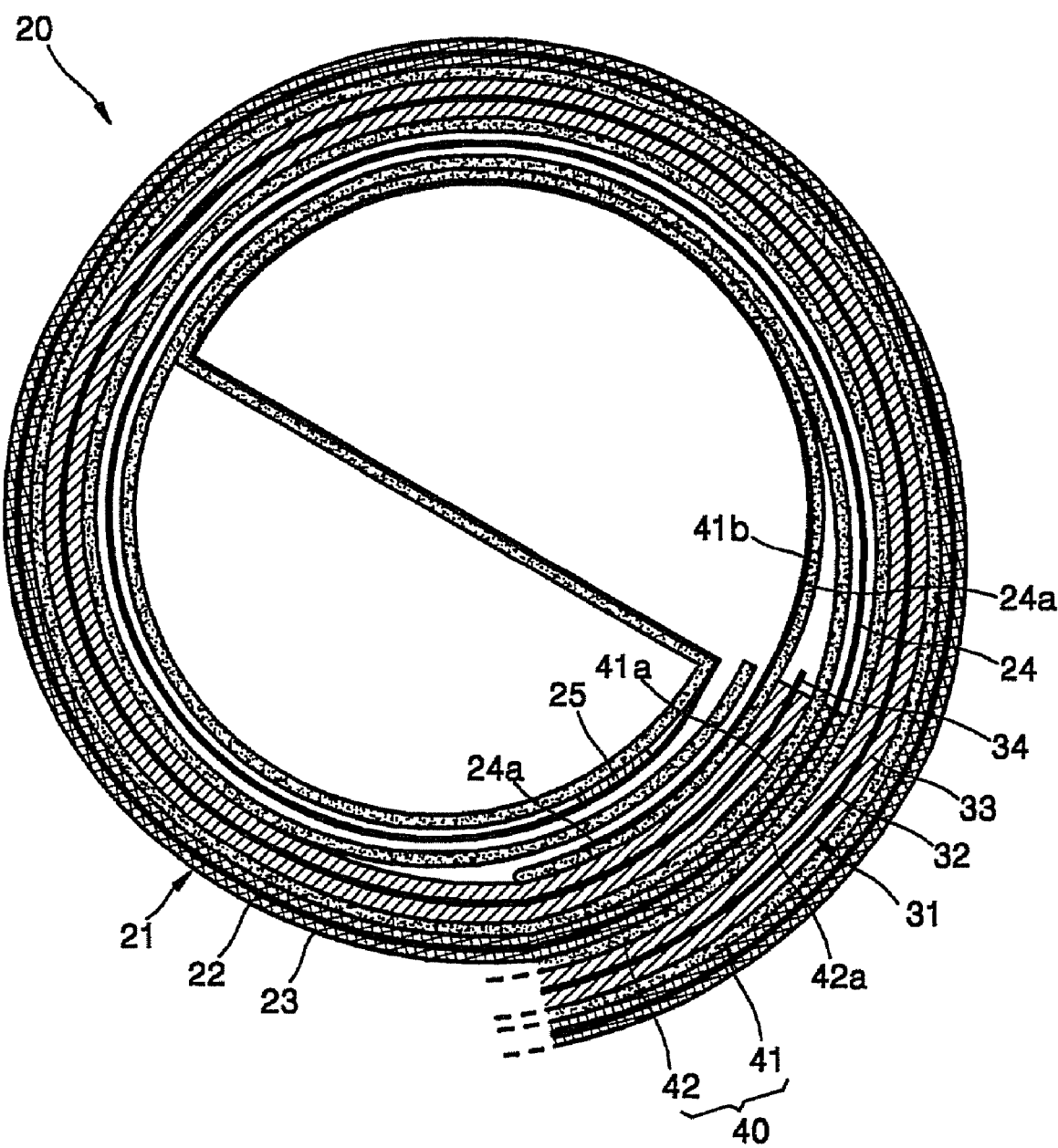
FIG. 9 is another cross-sectional view of the center portion of the electrode assembly of FIG. 6.

Alternatively, as shown in FIG. 9, only the first protective separator 41a may be extended to the side of the first electrode strip 21 attached with the first electrode tab 25 while the portion 24a is not positioned between the first and second protective separators 41b and 42b. In this case, the portion 24a of the exposed portion 24 protects the opposite side of the side of the first electrode strip 21 attached with the first electrode tab 25.

Figure 10:
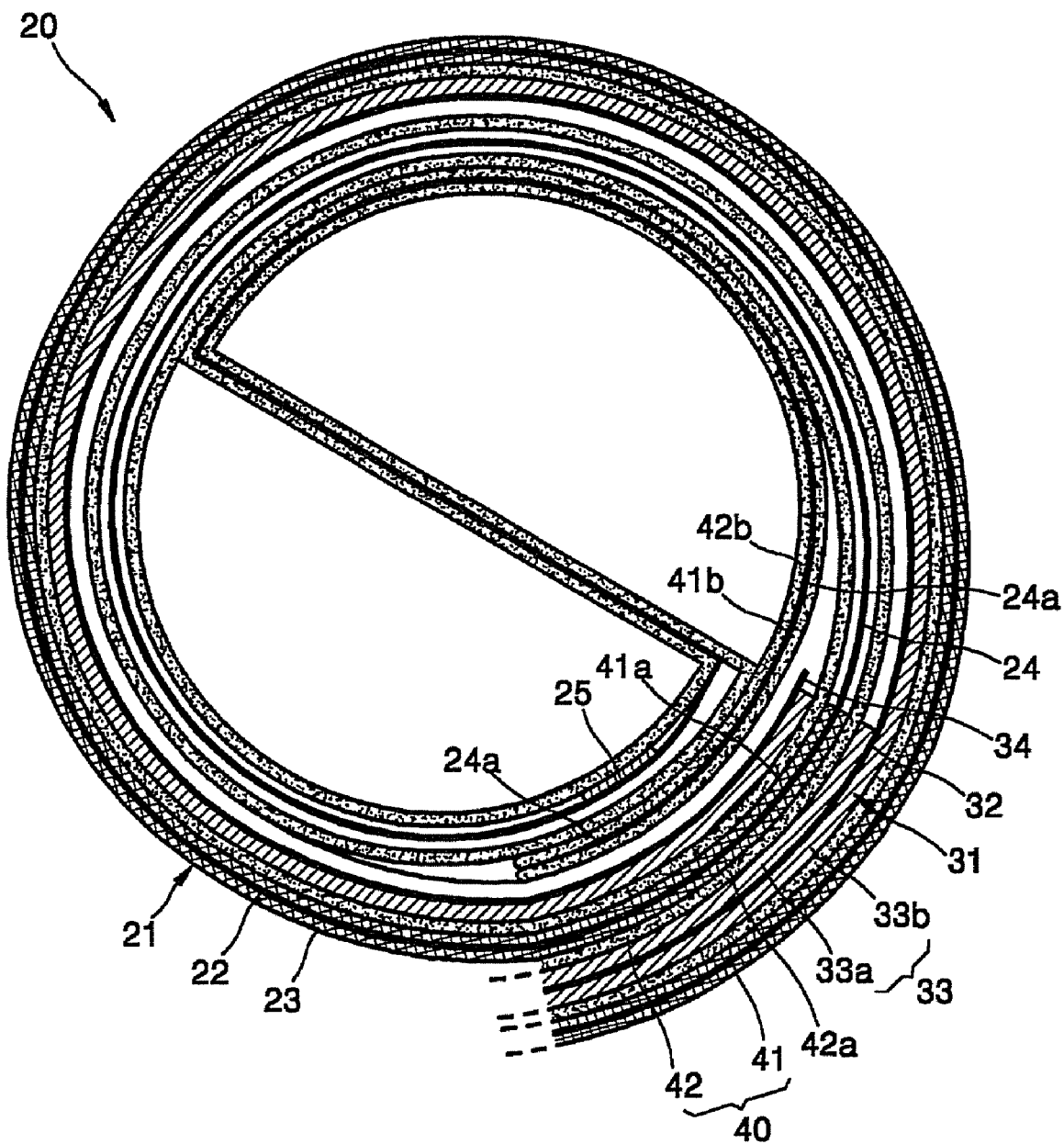
FIG. 10 is another cross-sectional view of the center portion of the electrode assembly of FIG. 6.

As describe above, in the electrode assembly 20, an electrode mixture may not be applied onto a side of the first or second electrode strip 21 or 31 that does not contact an active material layer of the other adjacent electrode strip 21 or 31 of different polarity and the separators 41 and 42. That is, referring to FIG. 10, the active material layer 33a is positioned on a side of the second electrode collector 32 facing the center of the electrode assembly 20 and the active material layer 33b is positioned on the other side. Starting points of the active material layers 33a and 33b are different from each other at an end of the second electrode strip 31, which resides on the first electrode strip 21 via the separators 41 and 42. An electrode mixture is not applied onto a front side of the first or second electrode strip 21 or 31 that is not available for battery reaction. Accordingly, volume of the electrode assembly 20 is not unnecessarily increased. Such asymmetrical application of the active material is also applicable to the outermost surface of a battery.

The invention is applicable to manufacturing various shapes, sizes, and types of electrode assembly, including the cylindrical batteries shown in FIGS. 1 through 10. For example, a rectangular or pouch-type battery may be fabricated by applying pressure onto an electrode assembly according to the present invention and placing the flattened electrode assembly into a rectangular can or a pouch case.

In addition to the method described above of protecting the side of the first electrode strip 21 attached with the first electrode tab 25, it is also possible to protect a side of the second electrode strip 31 attached with the second electrode tab 35.

Table 1 shows results obtained when performing several tests to evaluate the effectiveness of a secondary battery with a structure shown in FIG. 2 compared to that of a conventional secondary battery in which a sheet of separator is positioned on a side of an electrode strip attached with an electrode tab. Five secondary batteries according to the present invention and five conventional secondary batteries were used in the tests.

In Table 1, the secondary batteries according to the present invention and the conventional secondary batteries include the same type of separators. In particular, a sheet of separator is installed at a side of an electrode strip attached with an electrode tab of each of the conventional secondary batteries, the side facing a center of a rolled electrode assembly. Three sheets of separators are installed at a side of an electrode strip attached with an electrode tab of each of the secondary batteries according to the present invention, the side facing a center of an electrode assembly.

In the overcharge test of Table 1, the secondary batteries and the conventional batteries were charged to 250 percent of the rated capacity and exteriors of the batteries were observed.

In the penetration test, after standard charging of the secondary batteries and the conventional secondary batteries, the charging stopped within a range from 10 minutes to 72 hours. Next, the batteries were placed on a plane surface, a conductive tool, such as a nail or a chisel, was penetrated into the batteries, and the penetration was maintained until their surface temperatures reached 40° C. or less. The conductive tool was then removed from the batteries and the battery surface temperatures and exteriors were observed for 10 minutes.

In the impact test, after standard charging of the secondary batteries and the conventional secondary batteries, the charging stopped within a range from 10 minutes to 72 hours. Next, each battery was placed on a plane surface and fixed with a jig, a bar with a diameter of 15.8 mm was laid on the battery approximately perpendicular to the battery in a lengthwise direction. An object of 9.1 kg was then dropped on the battery from a height of 61 cm. Thereafter, the battery was left alone until the battery surface temperature reached 40° C. or less, the jig was removed, and the battery surface temperature and exterior were observed for 10 minutes.

In the crush test, after standard charging of the secondary batteries and the conventional secondary batteries, the charging stopped within a range from 10 minutes to 72 hours. Each battery was placed between two sheets of steel plates while being fixed with a jig, and a force of 13 KN was applied onto the battery or a pressure was applied onto the battery to press it to two-thirds of the original thickness. Thereafter, the battery was left alone until its surface temperature reaches 40° C. or less, the jig was removed, and then, the battery surface temperature and exterior were observed for 10 minutes.

In the drop test, the secondary batteries and the conventional batteries were dropped from heights of 1.9 m and 10 m, and their exteriors were observed.

In the thermal exposure test, after standard charging of the secondary batteries and the conventional ones, the charging

| Item | Secondary Batteries According to the Invention | | | | | | Conventional Secondary Batteries | | | | | |
|---|---|---|---|---|---|---|---|---|---|---|---|---|
| | L0 | L1 | L2 | L3 | L4 | L5 | L0 | L1 | L2 | L3 | L4 | L5 |
| Overcharge Test | 5 | | | | | | 5 | | | | | |
| Penetration Test | | 5 | | | | | | 5 | | | | |
| Crush Test | | 5 | | | | | | 2 | 3 | | | |
| Impact Test | 5 | | | | | | 3 | | | | 2 | |
| Drop Test (1.9 M) | 5 | | | | | | 5 | | | | | |
| Drop Test (10 M) | 5 | | | | | | 5 | | | | | |
| Thermal Exposure Test | | | | | 13 min. or more | | | | | | 10 min. or more | | was stopped within a range from 10 minutes to 72 hours. Each battery was then placed in a chamber, battery surface temperature was increased by 5° C. per minute, and the battery surface temperature and exterior were observed while maintaining current battery state for 1 hour when the battery surface temperature reached 150° C.

In Table 1, L0 includes a situation where there is no change regarding the exteriors of the batteries. In addition, L0 includes cases where there is no flash of light even when battery leakage is detected, and the battery exteriors are changed due to impacts applied during the tests while the batteries are remain hermetic.

In Table 1, L1 includes situations where the original battery weight decreases by at least 0.1 percent due to loss of an inner part of battery such as an electrolyte, a ruptured vent, and/or electrolyte leakage is visually detected. In general, electrolyte leakage is determined by measuring the weight of a battery after a test and comparing the measured weight with the original weight. However, such a process may be omitted from a battery safety test. Further, L1 includes leakage of electrolyte from the inside of battery due to battery components breakage caused by impacts applied during a test without causing smoke, emission of gas, or fire.

L2 includes a situation where smoke, such as vapor, emits from the inside of a battery without causing sudden heating and battery surface temperature is less than 200° C.

L3 includes a situation where smoke emits from the inside of a battery causing sudden heating, battery surface temperature is more than 200° C., gas emits intensely, and a battery surface temperature is greater than 200° C. due to sudden heating of the battery, even if no smoke is generated from the side of battery.

L4 includes a situation where battery contents are spontaneously ignited and burned causing violent flames or of the exterior of the battery is burned.

L5 includes a situation where battery contents come out from a battery due to a pressure applied from the inside of the battery, and portions of a battery case are broken into pieces, the portions do not include a vent of a battery.

In the thermal exposure test, a time required for each battery to enter the situation L5 is measured, starting from when the temperature of a chamber reaches 150° C.

As is apparent from Table 1, the secondary batteries and the conventional batteries showed the same results in the overcharge test, the penetration test, and the drop test. However, in the crush test, battery leakage was detected from all five secondary batteries, but battery leakage was detected from two of the conventional batteries and flashes of light were generated in the other three conventional batteries. In the impact test, none of the five secondary batteries showed any sign of burning but two of the conventional batteries ignited causing flames. In the thermal exposure test, the five secondary batteries exploded at least 13 minutes after the temperature of a chamber reached 150° C., but the conventional batteries exploded only 10 minutes after the temperature of a chamber reached 150° C.

The test results shown in Table 1 revealed that including an electrode assembly, according to the invention, into a secondary battery improves battery safety. In particular, the thermal exposure test showed that the explosion of a secondary battery including the electrode assembly according to the invention may be delayed by at least 3 minutes compared to that of a conventional battery.

As described above, a secondary battery according to the invention has the following advantages. First, the secondary battery does not under go much electrical short-circuiting between electrodes as a result of a separator breaking caused by heating a side of an electrode strip attached with an electrode tab. Second, electrical short-circuiting between electrodes may be prevented even if an electrode tab includes a surface defect, such as a burr. Third, battery safety is improved. Four, electrical short-circuiting may be prevented at a side of an electrode strip attached with an electrode tab even if a secondary battery is manufactured using conventional equipment. Fifth, the volume of an electrode assembly is not unnecessarily increased by having starting points of electrode mixtures positioned on first and second electrode strips the same.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode assembly comprising:
   a first electrode strip comprising a first electrode collector and a first electrode active material coated on the first electrode collector;
   a first electrode tab attached to a first side of the first electrode collector, at an uncoated portion of the first electrode collector;
   a second electrode strip comprising a second electrode collector and a second electrode active material coated on the second electrode collector;
   a first inter-electrode strip separator disposed between the first and second electrode strips; and
   a first protective separator inserted between the first electrode tab and the second electrode strip, wherein,
   the first electrode strip, the second electrode strip, and the first inter-electrode strip separator are rolled together in a first direction, and
   the first protective separator is rolled in an opposing second direction.

2. The electrode assembly of claim 1, wherein the first protective separator extends from an end of the first inter-electrode strip separator.

3. The electrode assembly of claim 1, wherein the first protective separator is attached to an end of the first inter-electrode strip separator.

4. The electrode assembly of claim 1, wherein the first electrode tab is located adjacent to a center of the rolled electrode assembly.

5. The electrode assembly of claim 1, wherein the first inter-electrode strip separator and the first protective separator are disposed on opposing sides of the first electrode collector.

6. The electrode assembly of claim 1, wherein the first protective separator is inserted between the first electrode tab and an end of the second electrode strip.

7. The electrode assembly of claim 6, wherein the first protective separator is bent, so as to extend across a center of the electrode assembly.

8. The electrode assembly of claim 1, wherein the first side of the first electrode collector faces a center of the electrode assembly.

9. The electrode assembly of claim 1, wherein the first side of the first electrode collector faces away from a center of the electrode assembly.

10. The electrode assembly of claim 1, wherein the first protective separator and the first inter-electrode strip separator are overlapped, rolled in the second direction, and inserted between the first electrode tab and an end of the second electrode strip.

11. The electrode assembly of claim 1, further comprising a second inter-electrode strip separator and a second protective separator that extends from an end of the second inter-electrode strip separator,
wherein the second protective separator is positioned on the first side of the first electrode collector.

12. The electrode assembly of claim 9, wherein the first protective separator extends along an opposing second side of the first electrode collector.

13. The electrode assembly of claim 1, wherein at least one of the first inter-electrode strip separator and the first protective separator has a multi-layered structure.

14. The electrode assembly of claim 1, wherein the uncoated portion of the first electrode collector and the first protective separator are both bent and inserted between the first electrode tab and the second electrode strip.

15. A secondary battery including the electrode assembly of claim 1, further comprising a cylindrical, prismatic, or pouch-type case, to house the electrode assembly.

16. An electrode assembly comprising:
a first electrode strip comprising a first electrode collector coated with a first electrode active material;
a first electrode tab attached to a first side of the first electrode collector, at an uncoated portion of the first electrode collector;
a second electrode strip comprising a second electrode collector coated with a second electrode active material,
a first inter-electrode strip separator disposed between the first and second electrode strips, and
a first protective separator extended from the first inter-electrode strip separator, wherein,
the first electrode strip, the second electrode strip, and the first inter-electrode strip separator are rolled together in a first direction, and
the first protective separator and the uncoated portion of the first electrode collector are rolled in an opposing second direction and inserted between the first electrode tab and the second electrode strip.

17. The electrode assembly of claim 16, wherein the first protective separator is attached to an end of the first inter-electrode strip separator.

18. The electrode assembly of claim 16, wherein the first electrode tab is disposed adjacent to a center of the electrode assembly.

19. The electrode assembly of claim 16, wherein the first inter-electrode strip separator and the first protective separator are positioned on opposing sides of the first electrode collector.

20. The electrode assembly of claim 16, wherein the first protective separator and the uncoated portion of the first electrode collector are inserted between the first electrode tab and an end of the second electrode strip.

21. The electrode assembly of claim 16, wherein the first protective separator and the uncoated portion of the first electrode collector are bent, so as to extend across a center of the electrode assembly.

22. The electrode assembly of claim 16, wherein the uncoated portion of the first electrode collector is inserted between the first electrode collector and an end of the second electrode strip.

23. The electrode assembly of claim 16, wherein the first side of the first electrode collector faces a center of the electrode assembly.

24. The electrode assembly of claim 16, wherein the first protective separator, the uncoated portion of the first electrode collector, and the first inter-electrode strip separator are overlapped and inserted between the first electrode tab and an end of the second electrode strip.

25. The electrode assembly of claim 16, further comprising a second inter-electrode strip separator and a second protective separator that extends from an end of the second inter-electrode strip separator,
wherein the second protective separator is positioned on the first side of the first electrode collector.

26. The electrode assembly of claim 16, wherein the first side of the first electrode collector faces away from a center of the electrode assembly.

27. The electrode assembly of claim 26, wherein the first protective separator extends along an opposing second side of the first electrode collector.

28. The electrode assembly of claim 16, wherein at least one of the first inter-electrode strip separator and the first protective separator has a multi-layered structure.

29. A secondary battery including the electrode assembly of claim 16, further comprising a cylindrical, prismatic, or pouch-type case, to house the electrode assembly.

* * * * *

UNITED STATES PATENT AND TRADEMARK OFFICE
CERTIFICATE OF CORRECTION

| | | |
|---|---|---|
| PATENT NO. | : 7,785,736 B2 | Page 1 of 1 |
| APPLICATION NO. | : 12/536782 | |
| DATED | : August 31, 2010 | |
| INVENTOR(S) | : Oh et al. | |

It is certified that error appears in the above-identified patent and that said Letters Patent is hereby corrected as shown below:

At Column 1, line 22, insert --.-- after "same.".

At Column 7, line 50, insert --at-- between "formed" and "at least".

At Column 7, line 61, insert --at-- between "formed" and "at least".

At Column 15, line 66, delete "under go" and insert, --undergo--.

Signed and Sealed this
Twelfth Day of April, 2011

David J. Kappos
*Director of the United States Patent and Trademark Office*